United States Patent [19]

Bloomer

[11] Patent Number: 4,580,088
[45] Date of Patent: Apr. 1, 1986

[54] SOFT-STARTING PHASE-CONTROL CIRCUIT FOR LOW VOLTAGE LOAD

[75] Inventor: Milton D. Bloomer, Scotia, N.Y.

[73] Assignee: General Electric Company, Schenectady, N.Y.

[21] Appl. No.: 584,705

[22] Filed: Feb. 29, 1984

[51] Int. Cl.⁴ .............................................. G05F 1/567
[52] U.S. Cl. ................................... 323/238; 323/243; 323/245
[58] Field of Search ............... 323/238, 242, 243, 245, 323/321; 363/49

[56] References Cited

U.S. PATENT DOCUMENTS

| | | | |
|---|---|---|---|
| 3,243,689 | 3/1966 | Perrins | 323/238 |
| 3,389,328 | 6/1968 | Janson | 323/238 |
| 4,180,852 | 12/1979 | Koizumi et al. | 363/49 |

Primary Examiner—William H. Beha, Jr.
Attorney, Agent, or Firm—Geoffrey H. Krauss; James C. Davis, Jr.; Marvin Snyder

[57] ABSTRACT

A soft-starting phase-control circuit for controlling both the cold in-rush and normal operating flows of current through a load from an A.C. source. The load may be resistive, may have a non-zero resistance temperature coefficient and may require a load voltage thereacross lower than the voltage provided by the A.C. source connected to the load and the control circuit. The control circuit utilizes at least one power switching device for selectively enabling and disabling the connection between source and load responsive to turn-on and turn-off states of a control signal provided at the output of a gate subcircuit. The gate subcircuit provides a turn-on state at a time, after each zero crossing, variably responsive to either a sensed load parameter when the load is in the normal operating condition, or to a selected starting sequence each time the load is initially energized (either intentionally or responsive to recovery from a detected fault condition) to limit inrush current to a relatively low multiple of the normal operating current. The start-up sequence of load turn-on states is responsive to gate enabling signals provided by comparison of a reference level with the instantaneous magnitude of a ramped signal, itself terminated and restarted at each line zero crossing. Only if a phase-locked loop has been synchronized to the source line voltage zero crossings can the gate means be driven to the turn-on state. The exact time when the ramp signal reaches the reference level is controlled by integration of the sum of the outputs of selected ones of a plurality of current sources.

28 Claims, 6 Drawing Figures

SOFT-STARTING PHASE-CONTROL CIRCUIT FOR LOW VOLTAGE LOAD

BACKGROUND OF THE INVENTION

The present application relates to load-current-controlling circuitry, and more particularly, to a novel phase-control circuit for operating a lower-voltage resistive load from a higher-voltage A.C. line, especially where the load is capable, at initiation of operation, of drawing in-rush currents which are much larger than the normal operating current thereof.

It is often desirable to operate a lower-voltage load from a higher-voltage source periodic waveform. Typically, such loads may be utilized for heating or lighting elements, and are fabricated of materials, such as tungsten and the like, having a large temperature coefficient of resistance. Hitherto, use of phase-control circuitry for controlling the magnitude of the load current, by switching the load across the line at a specific time after the start of each line waveform half-cycle and allowing load current conduction for the remainder of that source waveform half-cycle, placed relatively high stress on switching devices in series with the load, due to the relatively high in-rush current drawn by the "cold" load. It is not unusual for starting in-rush currents to exceed the normal operating current by a factor of 10 to 15 times. Thus, the semiconductor switches utilized to control such loads had hitherto been required to safely handle the peak in-rush current, rather than the much smaller operating current. The size and cost of such semiconductor switching devices are considerably greater than for a semiconductor device which is chosen to handle only slightly more than the normal operating current of the load, to provide an adequate safety margin. This problem is of particular importance when non-regenerative switching devices, such as power field-effect transistors (FETs) or insulated-gate transistors (IGTs), are utilized rather than regenerative devices, since the non-regenerative devices can be destructively driven out of the desired saturation operating region or suffer latch-up conditions, if not rated to handle the starting peak current of the load. It is therefore desirable to provide a circuit which will not only limit switching device peak currents with loads of the type having starting in-rush currents potentially an order of magnitude or more greater than the normal operating current, but also to provide a soft-starting circuit which will also control a load parameter, e.g. load power or the like, to afford maximum protection for circuit switching devices rated to obtain a lower-cost load control means.

BRIEF SUMMARY OF THE INVENTION

In accordance with the invention, a soft-starting phase-control circuit for controlling both the cold in-rush and normal operating flows of current through a load, which may be a resistive load and may have a non-zero resistance temperature coefficient) and may require a load voltage thereacross lower than the voltage provided by an A.C. source in series connection with the load and the control circuit, utilizes power switching means for selectively enabling and disabling the connection between source and load responsive to turn-on and turn-off states of a control signal provided at the output of a gate means. The gate means provides a turn-on state at a time, after each zero crossing, variably responsive to either a sensed load parameter when the load is in the normal operating condition, or to a selected starting sequence each time the load is initially energized (either intentionally or responsive to recovery from a detected fault condition) to limit in-rush current to a relatively low multiple of the normal operating current. The start-up sequence of load turn-on states is responsive to gate means enabling signals provided by comparison of a reference level with the instantaneous magnitude of a ramped signal, itself terminated and restarted at each line zero crossing. Only if a phase-locked loop means has been synchronized to the source line voltage zero crossings can the gate means be driven to the turn-on state. The exact time when the ramp signal reaches the reference level is controlled by integration of the sum of the outputs of selected ones of a plurality of current sources.

In one presently preferred embodiment, a first, substantially-constant-magnitude, current source is always connected to the summing bus to provide a ramp signal which, due only to the first source, will never reach the reference level before termination of the ramp signal at a next subsequent source line zero crossing. A second, variable-magnitude/current source is controlled by a start/run means; this means is in a first, or "start", configuration at load current initiation, to cause the second current source to provide an additional, slowly-increasing ramp of current to the summing bus, such that when added to the first current, the ramp current will gradually phase-forward the time at which each turn-on state commences, thus slowly increasing the flow of current to the "cold" load and limiting the in-rush load current to a relatively low value. When the load has reached a relatively "normal" operating condition, the start/run means is set to another, or "run", state to allow the desired load parameter to be sensed for controlling the output of another controlled-magnitude current source which is summed with the first source current to set the slope of the ramp signal and control the load turn-on time responsive to the actual load parameter condition sensed.

Accordingly, it is an object of the present invention to provide a soft-starting phase-control circuit for controlling a parameter of a load having a large temperature-coefficient-of-resistance, and allowing minimization of the current capable of flowing to the cold load under in-rush starting conditions.

This and other objects of the present invention will become apparent upon consideration of the following detailed description, when read in conjunction with the drawings.

DETAILED DESCRIPTION OF THE INVENTION

Figure 1:
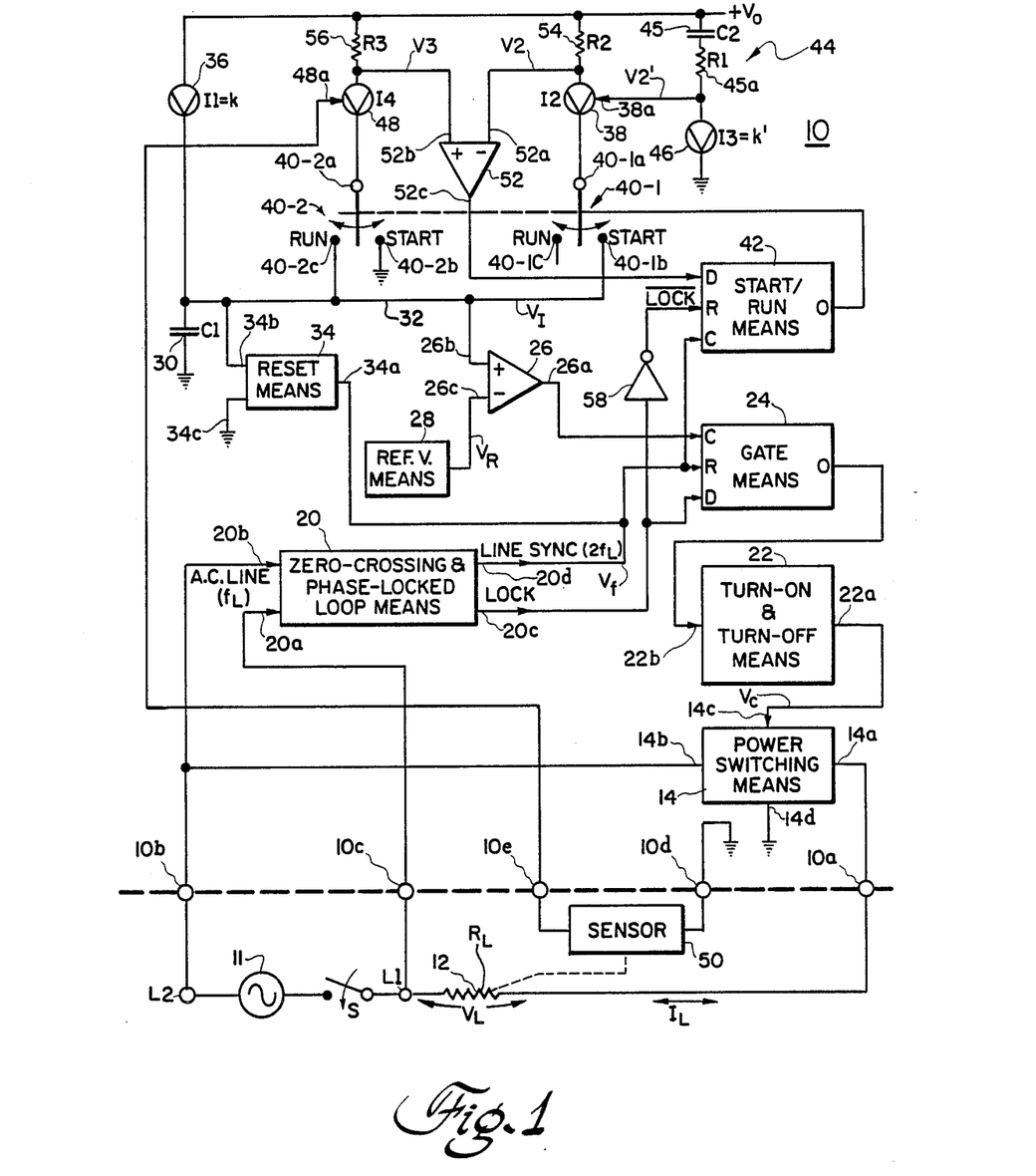
FIG. 1 is a schematic block diagram of a soft-starting phase-control means for low-voltage resistive loads, in accordance with the principles of the present invention.

Referring initially to FIG. 1, a soft-starting phase-control circuit 10 is utilized for controlling the flow of load current $I_L$ from an A.C. source 11 through a load resistance 12 connected between source line terminals L1 and L2, by action of a power switching means 14, when a main operating switch S is closed. Load 12, having a normal resistance $R_L$, is typically a resistive load, formed of a tungsten element and the like, operating with an average load voltage $V_L$ thereacross less than, or substantially equal to, the line-to-line voltage of A.C. source 11. One terminal of load 12 is connected to a first terminal 10a of the control circuit, and thence to a first terminal 14a of power switching means 14, while the line terminal L2 furthest therefrom is connected to a second terminal 10b of the control circuit and thence to a second terminal 14b of power switching means 14. The first line terminal L1, between source 11 and load 12, is connected to a third control circuit terminal 10c, for connection to one input 20a of a zero-crossing and phase-locked loop means 20, having another input 20b connected to second line terminal 10b. Power switching means 14, which may be integrated with the remainder of circuit 10 in a single integrated circuit if required to handle a small enough peak load current (or which may be a separate power switching module for larger load currents), completes the load current $I_L$ path between means terminals 14a and 14b, and therefore circuit terminals 10a and 10b, responsive to the state of a control voltage $V_C$ applied at a control input 14c, with reference to a circuit common potential at terminal 14d.

Power switching means 14 may be comprised of at least one power switching device, such as the first and second IGTs 16a-1 and 16a-2 (FIG. 2), respectively having their collector electrodes connected to power switching means terminals 14a and 14b, having their gate electrodes connected in common to switching means input 14c, and having their emitter electrodes connected in common to switching means common terminal 10d and thence to circuit common potential 14d. Power switching means 14 may include appropriate reverse-conduction means, such as the oppositely-poled diodes 16b-1 and 16b-2 respectively connected across the collector-emitter junctions of associated IGTs 16a-1 and 16a-2. One of switching devices 16 is driven into conduction, responsive to a logic 1 "on" state of the control $V_c$ voltage, during each source waveform half-cycle and terminates conduction, responsive to a logic 0 "off" state of the control $V_c$ voltage which occurs at the end of that source waveform half-cycle. The actual control signal for both turning-on and turning-off power switching means 14 is provided at the output 22a of a turn-on and turn-off means 22, responsive to the logic state of a signal at an input 22b thereof. This signal is derived at the output O terminal of a gate means 24.

Gate means 24, which includes a data D-type flip-flop, receives a logic signal at a data D input from a first output 20c of the zero-crossing and phase-locked loop (PLL) means, which output is at a first, e.g. high, logic level only if the PLL means is locked to the A.C. line frequency $f_L$. A reset R input of gate means 24 receives a signal $V_f$ from a second output 20d of the PLL means 20, which provides a line voltage synchronization signal at a frequency ($2f_L$) which is twice the line frequency $f_L$. A clock C input of gate means 24 receives a signal from an output 26a of a first comparator means 26, responsive to a comparison of a voltage $V_I$ at a first, non-inverting +input 26b thereof, with respect to a reference voltage $V_R$ level at a second, inverting—input 26c of the first comparator. Reference voltage $V_R$ is provided by a reference voltage means 28.

The voltage $V_I$ is an integrated, or ramp, voltage provided across an integration capacitor 30, of capacitive magnitude C1, connected between circuit common and an integration signal bus 32. The integration bus voltage $V_I$ is forced to a substantially zero magnitude at each line voltage zero crossing by a reset means 34, which receives the line zero-crossing synchronization information waveform $V_f$ voltage (provided at PLL means output 20d) at an input 34a for providing a low impedance connection between a resetting output 34b, connected to bus 32, and a common output 34c, connected to the circuit 10 common potential. A substantially linear ramp integration voltage $V_I$ of one of a plurality of different slopes is obtained by summing various ones of a plurality of currents from a plurality of current sources to increase the charge in integration capacitor 30, when integration bus 32 is released by reset means 34. A first current source 36 provides a first, substantially-constant current I1 (i.e. I1 = k, where k is a first constant) responsive to a circuit operating potential $+V_O$, present whenever circuit 10 is enabled by closure of main switch S. Operating potential for all of circuit 10 is provided by a power supply means 37 (not shown in FIG. 1 but illustrated in FIG. 2). The magnitude k of constant current I1 is specifically established such that sufficient charge is not added to integration capacitance 30 to cause integration bus voltage $V_I$ to reach reference voltage $V_R$, responsive only to the current I1 of first current source 36, during any source waveform half-cycle. Additional current must thus be added to integration capacitor 30, in addition to the current I1 of source 36, to change the state of the first comparator output 26a signal level. This additional current is initially provided, during the start-up portion of operation, by a second current source 38, providing a current I2. Current I2 is of a variable magnitude, as controlled by the magnitude of a control voltage V2' provided at a control input 38a. The second (variable) current source 38 current output I2 is connected to integration bus 32 by means of a first section 40-1 of a "start/run" switching network 40. Thus, the current I2 from second source 38 is routed to a first-section switch common terminal 40-1a, which can be selectively connected to a first-section switch first selectable terminal 40-1b in the "start" condition and to a first-section switch second selectable terminal 40-1c in the "run" condition. The connection of common terminal 40-1a to either of the selectable terminals 40-1b or 40-1c is responsive to the logic state of a output O signal of a start/run means 42, which may also utilize a data D-type flip-flop logic element.

The actual magnitude of variable current I2 is, as previously stated, controlled by the magnitude of the control voltage V2' provided at current source control input 38a. This control voltage V2' is the voltage at an input 38a, due to the voltage drop, below the operating potential $+V_O$ source, across a long-time-constant network 44 (comprised of a timing resistance 45b, of magnitude R1, and a timing capacitance 45a, of capacitive magnitude C2 and a diode 44c). This voltage drop is responsive to a substantially constant current I3 (I3 = k', where k' is a second constant different from the first constant k of current source 36) of a third source 46 connected between second current source control input 38a and circuit common potential. Current I3 of network 44/circuit 46 is ideally of an initially zero magnitude, to cause control voltage V2' to only reach a level effective to provide a non-zero current I2 from source 38 until line frequency synchronization, i.e. a logic 1 level at output 20c, occurs at some time after circuit "start-up" by closure of main switch S.

A fourth current source 48, which is another controlled current source providing a controlled current I4 responsive to the magnitude of a signal at a control input 48a thereof, is connected to the common terminal 40-2a of the second "start/run" switch section 40-2, and in the "start" condition is connected to second-section switch first selectable terminal 40-2b, itself connected to circuit common potential. Thus, in the start condition, current I4 is not added to the integration bus 32 current charging integration capacitor 30. Source 48 current I4 is only added to the total bus 32 current when second-section switch second selectable terminal 40-2c is connected to terminal 40-2a in the "run" condition (when second source current I2 is effectively removed from connection to the bus). The magnitude of the fourth source current I4 is determined by a load parameter sensor means 50, providing a signal at a circuit auxiliary control input 10e, with respect to circuit common terminal 10d. Sensor 50 is typically placed adjacent to load resistance 12 and monitors a selected load parameter-to-be-controlled.

A second comparator means 52 has a first, inverting—input 52a connected to the junction between second current source 38 and a resistance 54, of magnitude R2, connected in series therewith to the system operating potential $+V_O$ source. The V2 voltage at input 52a is thus related to the second source current I2, and is given by the equation $V2 = V_O - R2 \times I2$. A second, non-inverting + input 52a of the second comparator is connected to the junction between the fourth current source 48 and a resistance 56 in series therewith to the circuit operating potential. Resistance 56 has a resistive magnitude R3, such that the voltage V3 provided to input 52b is related to the magnitude of current I4, i.e. $V3 = V_O - R3 \times I4$.

The comparison of voltages V2 and V3 determines the logic state of an output 52c of the second comparator responsive to the relationship of $R2 \times I2$ and $R3 \times I4$, which provides information, i.e. a logic level, to the data D input of start/run means 42; this data level changes when the "start-up" ramp current is substantially equal to the "run" ramp current, thus taking the circuit out of the "start-up" mode and into the "run" mode. A clock C input of means 42 receives the line synchronization voltage $V_f$ waveform from PLL means output 20d, while an inverting means 58 is utilized to invert the LOCK signal at PLL means first output 20c to provide a not-locked ($\overline{LOCK}$) signal to the reset R input of start/run means 42. Thus, only if both (1) the PLL means of circuit 10 is locked in synchronism with the line zero crossings and (2) the "start" initial period of operation is completed, will the output of means 42 effectively connect second-section switch common terminal 40-2a to the second selectable "run" terminal 40-2c thereof and add the current I4 of source 48 to the total current integrated in capacitor 30. Since current I4 is controlled by sensor 50, the rate-of-change of integration voltage $V_I$ on bus 32 is varied, responsive to the monitored load parameter, to determine at what time, after each line zero-crossing, gate means 24 is operated to turn on the power switching means 14, via means 22. Similarly, detection of an undesirable condition via sensor 50 or loss of synchronized phase-locking to the A.C. line zero crossings will disable the output of means 24 and turn off power switching means 14, again via means 22. At such time, means 42 also operates to effectively configure switch means 40 for a re-start of circuit operation, when and if the fault condition clears.

Figure 2:
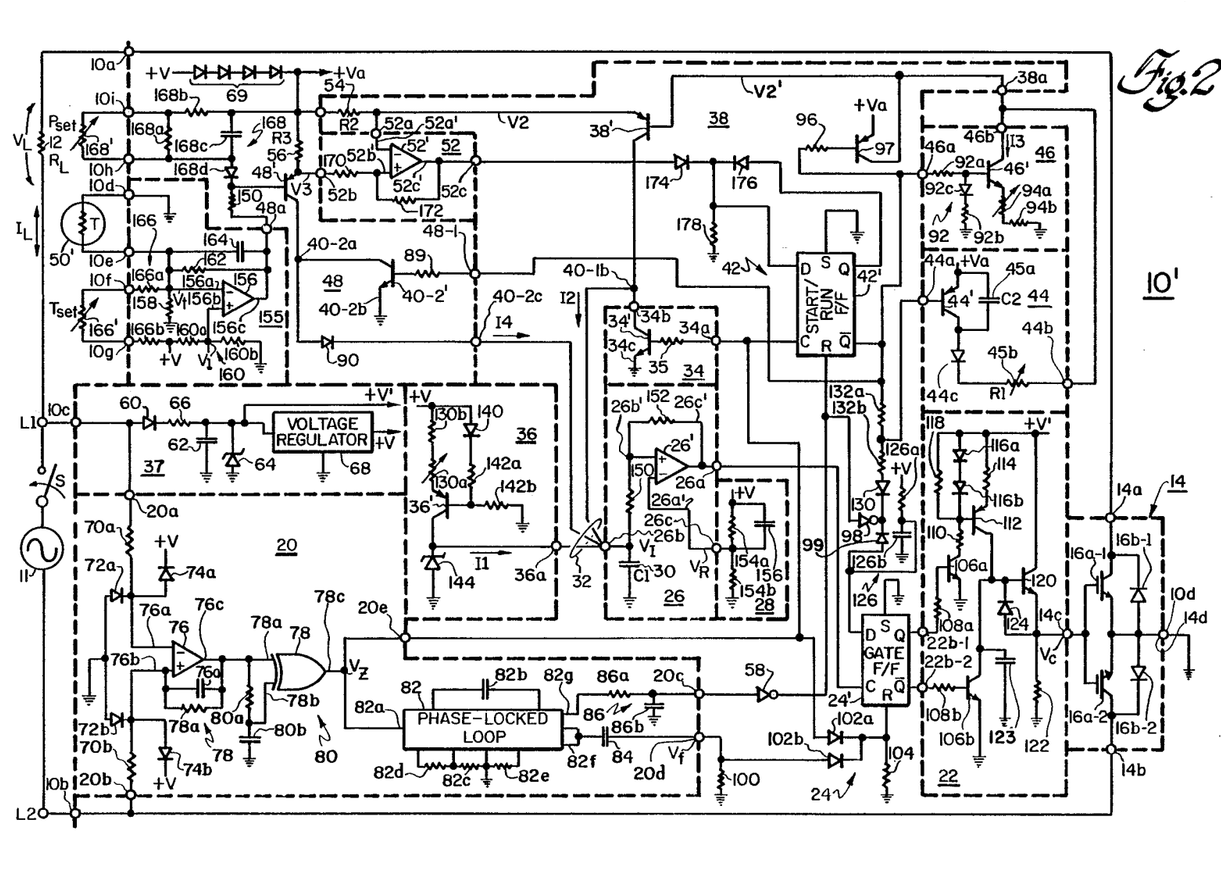
FIG. 2 is a schematic block diagram of one presently preferred embodiment of my novel soft-starting phase-control means for low-voltage resistive loads.

Prior to describing the operation of circuit 10 in greater detail, reference is made to FIG. 2, illustrating a presently preferred circuit embodiment 10' shown in block diagrammatic form in FIG. 1.

Upon closure of main switch S, circuit 10' remains essentially inoperative until supplied with operating voltages +V and +V' by power supply means 37. This occurs during the first several positive-polarity source waveform half-cycles, when the line L1 voltage at circuit input 10c is positive and power supply rectifier 60 conducts. Charge is added to power supply filtering capacitor 62, charging the capacitance to a maximum voltage determined by the zener voltage of a shunt zener regulator diode 64; charging current is limited by a series current limiting resistance 66. The zener diode 64 voltage is selected to provide the highest required circuit operating potential +V'. A three-terminal voltage regulator 68 is utilized in well-known manner to provide a highly-regulated, lower, second operating potential +V. The voltage +V is reduced to a third circuit operating potential +Va, by means of a series diode stack 69.

Figure 1A:
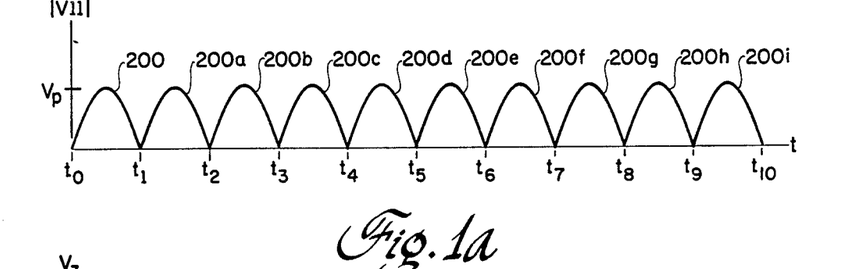
FIGS. 1a–1d are a time-coordinated set of waveforms found at various points in the circuit of FIGS. 1 and 2.

The voltage across source 11 also appears between zero-crossing and phase-locked loop means input terminals 20a and 20b. Each terminal is connected through a series current-limiting resistance 70a and 70b, respectively, to a pair of protection circuits, utilizing diode 72a or 72b and diode 74a or 74b, respectively, to prevent the voltage at the associated first, inverting-input 76a or the second, non-inverting+input 76b of a third comparator means 76 from going substantially more negative with respect to circuit common potential or substantially more positive than operation potential +V. The non-inverting input 76b is connected through a feedback network 78, comprising a feedback resistance 78a in parallel with a feedback capacitance 78b, to the output 76c of the third comparator. Third comparator output 76c is directly connected to a first input 78a of an exclusive-OR gate 78. A time-delay network 80 is connected between comparator output 76c and common potential, with a delay resistance 80a being connected between the first gate input 78a and a second gate input 78b, and a delay capacitance 80b connected between gate input 78b and circuit common potential. The output 78c of gate 78 provides a signal voltage $V_z$ which provides a positive-going, high logic level pulse 20' (see FIG. 1b) for each line zero crossing, e.g. at times $t_0$–$t_{10}$ as illustrated for the absolute value of the source voltage $|V11|$ waveform in FIG. 1a. The width $T_p$ of each of pulses 20' is determined by the time delay characteristics of network 80; each of these pulses is relatively narrow, with the pulses shown in FIG. 1b being somewhat exaggerated in time duration for purposes of illustration. The logic 1 zero-crossing pulse waveform $V_z$ is provided at an auxiliary output 20e of the zero-crossing and phase-locked loop means 20. The zero-crossing pulses are also provided to the reference frequency input 82a of a phase-locked loop means 82, such as provided by commonly available integrated circuit phase-locked loop (PLL) means. The PLL means 82 operates in conjunction with a free-running-frequency-setting capacitance 82b and various resistive elements 82c–82e to provide a line synchronization waveform at a first output 82f, which waveform is at twice the line frequency (i.e. $2f_L$) and is coupled through a capacitance 84 to second output 20d of the phase-locked loop means. Only if the free-running frequency is locked to the line zero crossings is a LOCK output 82g raised to a logic 1 level. The signal at LOCK output 82g is low-pass-filtered by a low-pass filtering means 86, comprised of a series resistance 86a between output 82g and means first output 20c, and a filtering capacitance 86b connected from means output 20c to circuit common potential. Operational details of this portion of the circuit are more fully described in my co-pending application Ser. No. 432,000, filed Oct. 1, 1982, now U.S. Pat. No. 4,461,990 issued July 24, 1984, assigned to the assignee of the present invention and incorporated herein in its entirety by reference. For purposes of explanation, it is sufficient to understand that the voltage at LOCK output 20c is raised to a logic 1 level at some time $t_L$ after the zero-crossing pulses 20' of waveforms $V_z$ and $V_f$ first appear at the respective outputs 20e and 20d, as illustrated by the broken-line LOCK waveform leading edge 20" in FIG. 1b appearing after several zero-crossing pulses, e.g. two pulses 20a and 20'b, have occurred.

The LOCK signal at output 20c is thus at a logic 0 level at circuit start-up, and is, by action of inverter 58, provided as a logic 1 LOCK signal to the reset R input of the data D-type flip-flop logic element 42' of start-/run means 42. This causes the complementary $\overline{Q}$ output of flip-flop 42' to be held at a high, logic 1, level, until at least LOCK signal leading edge 20' occurs.

Responsive to the logic 1 level at the $\overline{Q}$ output of start/run flip-flop 42', the voltage at fourth current source terminal 48-1 is at a high level and provides a current (through a base resistance 89) of sufficient magnitude to drive switching transistor 40-2' into saturation. Thus, transistor 40-2' electronically performs the second switch section 40-2 function of connecting the second-section common switch terminal 40-2a (i.e., at the transistor collector) to the common potential at first selectable terminal 40-2b (i.e. at the emitter terminal thereof); the current source 48 output current, provided by the collector current of a source transistor 48', is (by saturation of transistor 40-2' and reverse-biasing of series diode 90) thus effectively disconnected from bus 32 at circuit start-up. The high, logic 1, level at flip-flop 42' complementary $\overline{Q}$ output is also applied to the input terminal 46a of third current source means 46. The third current source transistor 46' receives base drive through a base biasing network 92, comprise of a series resistance 92a and a shunt resistance 92b in series with a temperature-compensating diode 92c; the source current I3 is set by the total resistance 94, comprised of a variable resistance 94a and a fixed resistance 94b, connected in series between the emitter electrode of third current source transistor 46' and ground potential. The third source current I3 flows into third current source output sink terminal 46b. Simultaneously, the logic 1 level at the $\overline{Q}$ output is also applied through a base resistance 96 to cut off a (PNP) transistor 97, receiving third operating potential $+V_a$ at the emitter electrode thereof, and having the collector electrode thereof connected to second source input 38a. The third current source 46 must thus draw its current I3 from means 44, as explained hereinbelow.

At the same time, the logic 1 LOCK signal is reinverted by a second inverter 98 to provide a low, logic 0, level signal at the data D input of the flip-flop 24' of gate means 24. Any zero-crossing pulses provided at the zero-crossing voltage $V_z$ output 20e or the PLL loop output 20d (and appearing across a load resistance 100), are logically-OR'd by diodes 102a and 102b and provide a logic 1 level across resistance 104, at the resetting R input of flip-flop 24', assuring, in addition to the logic 0 level at the data D input, that the complementary Q output of flip-flop 24' is at a high, logic 1 level at output 22b-2, and that the $\overline{Q}$ output of the flip-flop is at a low, logic 0 level at output 22b-1, thus causing turn-on and turn-off means 22 to keep power switching means 14 in the turned-off condition.

While many forms of turn-on and turn-off means 22 can be utilized, in the presently preferred embodiment means 22 includes first and second control transistors 106a and 106b, each respectively having their emitter electrodes connected to circuit common potential and their base electrodes connected to the associated one of inputs 22b-1 and 22b-2 through biasing resistances 108a or 108b, respectively. The collector electrode of transistor 106a is connected through a resistance 110 to the base electrode of a PNP current source transistor 112, having its emitter electrode connected through a current-setting resistance 114 to operating potential $+V'$. Additional base circuit components, including diodes 116a and 116b and a shunt resistance 118, are connected between operating potential $+V'$ and the base electrode of transistor 112. The collector electrode of transistor 112 is connected in parallel with the connector electrode of switching transistor 106b to the base electrode of a transistor 120. With its collector electrode connected to operating potential $+V'$, and its base electrode receiving drive current from transistor 112, transistor 120 operates as an emitter follower to provide turn-on current from the emitter electrode thereof to means output 120a and thence to the control input 14c of the power switching means. A resistance 122 is connected between output 22a and common potential to provide an emitter-follower load for device 120. The anode of a turn-off diode 124 is connected to output 22a and the cathode thereof is connected to the collector electrode of turn-off switching transistor 106b, to facilitate a rapid reduction in the control voltage $V_C$ magnitude and rapidly turn-off power switching means 14 when input 22b-2 is at a high level. A capacitor 123 is charged by the current source including transistor 112 and is buffered by the emitter-follower using transistor 120, to control the rate-of-change of the power switching means input "turn-on" current.

The initial high, logic 1, level at the complementary $\overline{Q}$ output of start/run flip-flop 42', combined with the low logic level at the output of inverter 98, serves to (1) maintain the D input of flip-flop 24' at a low logic level, as diode 99 conducts and overcomes the effect of an integrator 126 (having a series resistance 126a between operating potential $+V$ and the data D input of flip-flop 24', and an integration capacitor 126b from the data D input to circuit common potential), and (2) forward bias a diode 130 and provide a voltage at the network input 44a, at the junction of resistances 132a and 132b in series with diode 130. When input 44a is at a voltage less than potential $+V_a$, a PNP transistor 44' is saturated, providing a short circuit across capacitor 45a and a voltage drop across forward-biasing series diode 44c and resistor 45b, if the PLL means is not yet locked. Because transistor 97 is cut off, transistor 44' supplies whatever current is drawn by third current source 46 and the second current source input 38a is only one base-emitter diode voltage drop below operating potential $+V_a$ and second current source PNP transistor 38' is in the cut-off condition; thus, current I2 does not flow through the R2 resistance 54 and is not initially available at bus 32.

Currents I2 and I4 are not available at initial start-up; the only current available is current I1 from first current source 36. This current source comprises a PNP current-source transistor 36', having its emitter electrode connected in series with a variable resistance 138a and a fixed resistance 138 to operating potential +V source and having its base electrode connected to the same operating potential source through a temperature-compensating diode 140 and a first bias resistor 142a, and the base electrode connected through a second biasing resistance 142b to circuit common potential. The anode of a zener diode 144 is connected to circuit common potential while the cathode of the zener diode is connected both to the current-source transistor 36' collector electrode and the first current source output 36a, which is itself connected to bus 32 and thence to integrator capacitor 30 and the input 26b of first comparator means 26. Thus, as soon as operating potential +V is available, first current source 36 begins to supply first current I1, linearly charging integration capacitance 30 toward a ramp voltage $V_I$ maximum level equal to the zener voltage of diode 144.

The voltage $V_I$ across integration capacitance 30 is applied through an input resistance 150 to the non-inverting input 26b' of operational amplifier 26'. The input 26b' is connected through a feedback resistance 152 to the operational amplifier output 26c', itself connected to first comparator output 26a, which supplies the clock signals to the clock C input at flip-flop 24', as explained hereinbelow. The inverting input 26a' of the operational amplifier is connected to comparator reference voltage $V_r$ input 26c, receiving the reference voltage $V_R$ from reference voltage means 28. The reference voltage of means 28 appears at the junction of a reference divider comprised of first and second resistors 154a and 154b, connected between operating potential +V and circuit common potential, and utilizing a initialization capacitor 156 in parallel connection across divider resistance 154a.

The fourth (second variable) current source 48 utilizes, as previously described, diode 90, current-source transistor 48' and emitter resistor 56. The base electrode of transistor 48' is biased by a network which includes a first resistance 150 connected to current source control input 48a, which input must be responsive to the changes in the output of sensor 50 monitoring the chosen parameter of load resistance 12. In the illustrated embodiment, the load resistance temperature is the selected sensed parameter, whereby the sensor is a thermistor 50' in close physical proximity to the load resistance. Thermistor 50' is connected between circuit common potential terminal 10d and sensor input terminal 10e. To convert the sensor resistance, which varies responsive to changes in the load 12 temperature, means 155 is utilized. Means 155 includes an operational amplifier 156 having a first, inverting—input 156a connected to sensor terminal 10e and also connected to circuit common potential through a resistance 158. The other, non-inverting +input 156b of operational amplifier 156 receives a substantially-constant reference potential $V_1$, at the output junction of a reference voltage divider 160 having a first resistance 160a connected between operating potential +V and input 156, and a second resistance 160b connected between input 156b and circuit common potential. The operational amplifier output 156c is connected to the fourth current source control input 48a, and is also connected through a feedback resistance 162 and feedback capacitance 164, to operational amplifier input 156a, at which the load temperature-responsive voltage $V_t$ appears. To facilitate setting the temperature set-point to be controlled by operational amplifier output 156c, the load-temperature-responsive voltage $V_t$ is made variable by connection of a variable-resistance network from input 156a to operating potential +V. This network 166 includes first and second fixed resistors 166a, connected between input 156a and a circuit auxiliary terminal 10f, and a second fixed resistance 166b connected between circuit auxiliary terminal 10g and operating-potential +V. A variable temperature-setting resistance 166' is connected between terminals 10f and 10g and is typically external to circuit 10, especially when circuit 10 is fabricated in integrated circuit form. It will be seen that the output 156c voltage is the control-voltage for the fourth current source, such that I4 can be set by temperature-setting resistance 166' (and its associated resistors 166a and 166b) in conjunction with the thermistor 50' resistance.

The controlling action of the amplifier output 156c voltage on the fourth current source is also limited by a fourth current source biasing network 168, which includes a first resistance element 168a connected between circuit auxiliary terminals 10h and 10i, a second resistance element 168b connected between terminal 10i and the +Va potential source, a filtering capacitance 168c connected across both series-connected resistances 168 and 168b, and a diode 168d, having its anode connected to terminal 10h and its cathode-connected to the base electrode of current-source transistor 48'. A variable resistance 168' is connected between terminals 10h and 10i (and is also typically external of the integrated-circuit form of circuit 10) for the purpose of controlling the bias-current supplied to source transistor 48' and thus limiting the maximum load resistance power level, when a thermistor sensor 50' is utilized for load temperature (and therefore power) control.

The current I4, substantially linearly controlled by load 12 temperature variations, provides the V3 voltage at input 52b of second comparator means 52. Input 52b is connected through an input resistance 170 to the non-inverting+input 52b' of a comparator 56', having its inverting—input 52a' connected to second comparator input 52a. A feedback resistance 172 is connected between input 52b' and output 52c', itself connected to second comparator output 52c. Output 52c is connected to the anode of a diode 174, having its cathode connected to the data D input of start/run flip-flop 42'. This input is also connected to the cathode of another diode 178, having its anode connected to the Q output of the flip-flop, and is connected through a resistance 178 to ground potential. Diode 174 and latching diode 176, in conjunction with resistance 178, form a two-input OR gating means, providing the start/run flip-flop data D input with the more positive of the voltages at the Q output of the flip-flop or at the second comparator output 52c.

In operation, and referring to all of the Figures and especially to FIGS. 1a–1d, circuit 10 or 10' does not receive operating power until the first positive-polarity source waveform half-cycle. Zero-crossing and PLL means 20 thus begin producing positive pulses 20' only after the power supply means 37 is capable of supplying operating potential. The phased-locked loop 82 is not locked to the power line zero crossings until several zero crossings after power is applied to the circuit.

During these initial few source waveform half-cycles, as exemplified by the first half-cycle absolute source 11 voltage |V11| half-sinusoid waveform 200 (FIG. 1a), between time $t_O$ and time $t_1$, a positive-going, logic 1 pulse 20'a is produced at time $t_0$ and is available at output 20e. Gate flip-flop 24' receives a logic 1 level at the reset R input thereof and maintains power switching means 14 in the non-conductive condition. Simultaneously, resetting means transistor 34' receives sufficient base current through series resistor 35 to provide a low impedance from bus 32 to common potential. When pulse 20'a (FIG. 1b) returns to the logic 0 level, reset means 34' releases bus 32 and the substantially-zero bus voltage $V_I$ begins to linearly increase as integration capacitor 30 is charged by the current I1 of first current source 36. As previously mentioned, the lock voltage at means output 20c is still at a logic 0 level, providing a logic 1 level at the reset R input of flip-flop 42', disabling the second and fourth current sources, such that integration capacitor 30 does not receive either current I2 or current I4. Accordingly, the integration voltage $V_I$ linearly ramps upwardly responsive only to current I1; the ramp voltage 205a (FIG. 1c) has a sufficiently low rate-of-change, established by the setting of first current source variable resistance 138a, such that voltage ramp 205a does not reach the reference voltage $V_R$ level 210 by time $t_1$, at the end of the particular source waveform half-cycle. At time $t_1$, the absolute value of the source 11 voltage is again zero and a next zero-crossing pulse 20'b is produced. Responsive to this pulse, reset means 34 operates to rapidly discharge integration capacitor 30 and pull the integration voltage $V_I$ back to substantially the zero voltage level. Thus, gate flip-flop 24' does not receive a clock C input pulse and is not enabled and power switching means 14 does not provide a path for a flow of load current $I_L$ through load 12. The foregoing sequence is repeated for all source waveform half-cycles until the phase-locked loop means is locked into synchronization with the line zero crossings. This is assumed, for purposes of illustration, to occur during source waveform half-cycle 200a, between time $t_1$ and time $t_2$, with the LOCK voltage at PLL means output 20c rising to the logic 1 level as indicated by rising edge 20'', in FIG. 1b, at a time $t_L$ after the half-cycle starting time $t_1$.

Figures 1B, 1C:
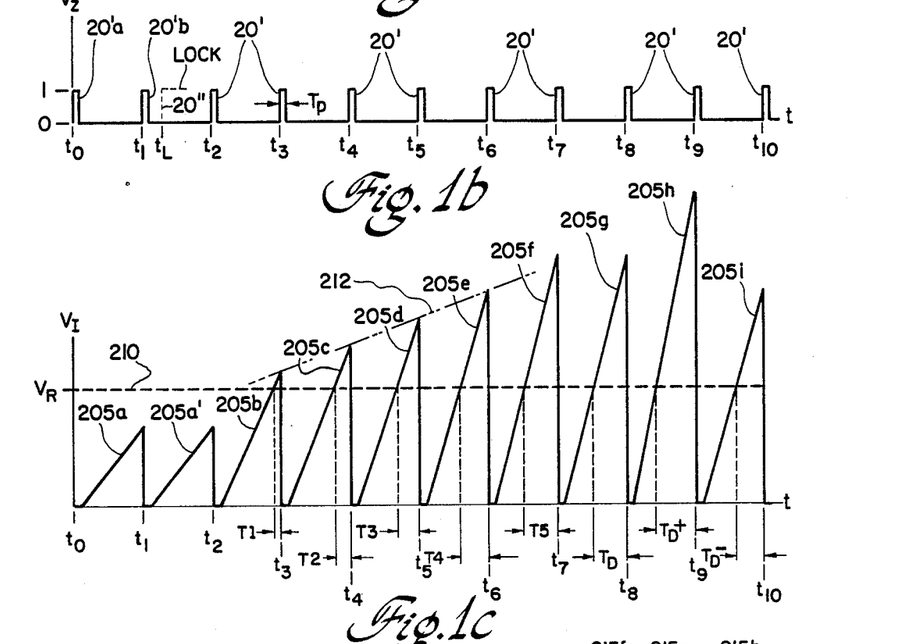
Figure 1D:
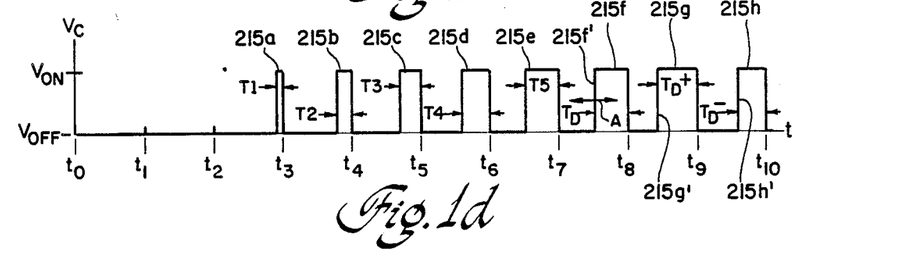

During this source waveform half-cycle 200a of operation, the bus 32 voltage is reset at time $t_1$ to substantially zero volts by means 34, as previously mentioned, and shortly after time $t_1$ is released thereby. The bus integration voltage $V_I$ again substantially linearly increases at the lowest rate-of-change, in portion 205a' in response only to receipt of first source current I1. The bus 32 current does not change when the lock output 20c level changes at time $t_L$. At that time, the voltage at output 20c has risen to a logic 1 level, providing a logic 0 level at the reset R input of the start/run flip-flop 42', releasing the outputs thereof, and also supplying a logic 1 level at the output of inverter 98, releasing the gate flip-flop 24' data D input (the voltage of which charges toward a logic 1 level by action of integrator network 126). Since the start/run flip-flop 42' complementary $\overline{Q}$ output remains at a logic 1 level, reset transistor 40-2' remains saturated, disabling the I4 current source, while transistor 44' remains saturated, disabling the I2 current source. Therefore, the integration bus voltage $V_I$ again increases at the same slow rate-of-change, in portion 205a', and never reaches the reference voltage $V_R$ line 210 before resetting at time $t_2$, so that power switching means 14 is not enabled during this half-cycle of the source waveform.

At the first zero crossing after LOCK occurs, i.e. at time $t_2$, pulses 20' at both the 20e and 20d outputs of zero-crossing and PLL means 20 are utilized with the LOCK signal to precondition the circuit for load current flow in the "start" mode of operation. The zero-crossing pulse 20' is transmitted through diode 102a and resets gate flip-flop 24' while also applying a clock pulse at the clock C input of start/run flip-flop 42' (whose reset R input is now released, due to the attainment of the LOCK condition). Even though the load temperature is below the temperature set by variable resistance 166' and a sufficient potential is present at fourth current source input 48' to cause transistor 48' to furnish some current I4, transistor 40-2' is saturated and prevents current I4 from being added to bus 32. However, the flow of current through fourth current source transistor 48' causes voltage V3 to be less than the operating potential $V_a$ which is, because of the non-conduction of transistor 38', the voltage V2 at second comparator input 52a. The second comparator output 52c, and therefore the data D input of flip-flop 42', is at a logic 0 level, maintaining the start/run flip-flop in the reset condition, in spite of the presence of a valid clock pulse at the clock C input thereof and the release of the reset R input thereof. The high, logic 1, level at the complementary $\overline{Q}$ output of flip-flop 42' has already turned on third current source 46, but, as transistor 44' has switched from saturation to cut-off in response to diode 130 being reverse-biased, capacitor 45a begins to slowly charge through R1 resistance 45b and current I3' begins to flow with a small initial magnitude. This causes the voltage at input 38a, i.e. the base voltage of second current source transistor 38', to begin ramping downwardly from voltage $+V_a$ at a rate determined by the resistance R1 of adjustable resistance 45b and the capacitance C2 of capacitor 45a. As control voltage V2' ramps down in substantially linear fashion, the second source current I2 increases, commencing after the reset pulse 20', at time $t_2$, ends and reset means 34 is disabled. The linearly increasing current I2 is added to constant current I1 to charge capacitor 30, causing the integrator voltage $V_I$ to increase at a faster rate, as shown by $V_I$ portion 205b. Portion 205b thus has a greater rate-of-change slope than the slope of portion 205a. The increased current (I1+I2) is adjusted, by adjustment of variable resistances 45b and 94a, to cause the integration voltage $V_I$ portion 205b to reach the first comparator reference voltage $V_R$ level 210 at some time shortly before the time $t_3$ at which the half-cycle 200b ends. At this time, e.g. time ($t_3-T1$), the normally-low first comparator output 26a voltage promptly changes to a high, logic 1, level and provides a rising edge transition to the clock C input of the gate flip-flop 24'. As the data D input has now risen substantially to the logic 1 level, the gate flip-flop Q output is enabled and the $\overline{Q}$ output is disabled, providing a logic 1 level at means input 22b-1 and a logic 0 level at means input 22b-2. This causes the turn-on and turn-off means 22 to enable power switching means 14 for conduction of load current $I_L$ through resistive load 12 for the short time interval $T_1$ immediately prior to the zero crossing at time $t_3$. At time $t_3$, another pulse 20', of very short pulse width $T_P$, occurs. The gate flip-flop is reset, restoring the Q output thereof to the logic 0 level and the $\overline{Q}$ output to the logic 1 level, to cause means 22 to remove enabling drive to power switching means 14 and turn means 14 "off" to the nonconducting condition, disabling current flow through load resistance 12. Thus, the resistive load initially receives a load current pulse 215a (FIG. 1d) of very short duration $T_1$.

The ramp time constant for the second current source 38, set by capacitance C2 and resistance R1, is sufficiently long so that it requires a plurality of source waveform half-cycles before the magnitude of current I2 is sufficient to lower voltage V2 to the same level as the sensor-controlled voltage V3 at the remaining input of second comparator 52. During this multiplicity of cycles, the magnitude of current I2 gradually increases (with a long time constant as shown by a broken line 212 connecting the peaks of the interpreted voltage $V_I$ portions 205), such that, when the slowly increasing magnitude of current I2 is added to the constant current I1, the slope of ramp portions 205, e.g. portions 205b–205f, gradually increases and causes the power switching means input voltage $V_C$ to be present for increasingly greater intervals 215a–215e of time. Thus, after resetting by pulse 20′ at time $t_3$, the integrated voltage portion 205c rises at a greater rate-of-change than the rate-of-change of the previous portion 205b, due to the increased magnitude of second source current I2, and causes the reference voltage $V_R$ line 210 to be reached at an earlier time, e.g. time ($t_4$-T2), than the time at which portion 205b crossed the reference voltage line 210. Therefore, during source waveform half-cycle 200c, the power switching means receives a control voltage enabling pulse 215b and provides a current pulse of duration T2, greater than the current pulse 215a duration T1 during the previous half-cycle. Similarly, during subsequent half-cycles 200d, 200e and 200f, the increasing magnitude of second source current I2 provides increasing magnitudes of the integrated voltage $V_I$ slope portions 205d, 205e and 205f, respectively, causing each of these portions to rise from the substantially zero reset value and reach the reference voltage $V_R$ level 210 with increasingly greater times before the time, e.g. $t_5$, $t_6$ and $t_7$, at which the respective half-cycle waveform end. Therefore, the time intervals T3, T4 and T5, respectively, during which power switching means 14 is enabled and load current $I_L$ flows, as respective load current pulses 215c, 215d and 215e, increases. For purposes of illustration, it is assumed that the increasing second source current I2 provides a load current pulse 215e of sufficient duration, in the interval between time $t_6$ and time $t_7$, such that at the beginning of the next source waveform half-cycle 200g, the voltage V2 at second comparator input 52a is substantially equal to the voltage V3 at second comparator second input 52b, and causes second comparator output 52c to change state and provide a high, logic 1 level to diode 174 and the data D input of gate 42′.

At this time, e.g. time $t_7$, gate flip-flop 24′ is again reset, as are the second and fourth current sources by means of transistors 34′ and 40-2′. The pulse 20′ also provides a proper clock pulse at the clock C input of start/run flip-flop 42′, now having a logic 1 level at the data D input thereof, due to the change in state of the second comparator output 52′, responsive to voltage V2 becoming at least equal, if not less than, the magnitude of voltage V3. The logic 1 level at the D input of flip-flop 42′ is thus clocked through to set the Q output to a logic 1 level and reset the complementary Q̄ output to a logic 0 level. The latter action simultaneously disables current-source means 44 and 46, places transistor 97 in the saturated condition to place the second current source transistor 38′ into cut-off, and removes transistor 40-2′ from saturation. The logic 1 level at the Q output of flip-flop 42′ latches, via diode 176, the data D input thereof to the logic 1 level, changing the circuit mode of operation from "start" to "run". Flip-flop 42′ remains in the "run" condition until circuit 10 is either powered down, or until a logic 1 level appears at the reset R input of flip-flop 42′, if the PLL means looses synchronizing lock with the line frequency zero crossings. Thus, start-up second current source 38 is disabled and second current I2 ceases to flow. However, the cutting off of transistor 40-2′ removes the low impedance from the anode of diode 90 and allows the second variable source current I4 to be added to the integration bus 32, to cause the slope of the integrated voltage portions 205g, et seq. to be controlled by sensor 50′. Thus, the delay after each zero crossing, i.e. the time at which power switching means 14 is enabled to allow a flow of current through load 12, is established by the source current I4 proportional to the control error voltage V3 signal provided responsive to the actual load parameter being monitored. It will be seen that the average load current $I_L$ has been gradually increased during the "start" initial time interval to prevent the devices 16 of power switching means 14 from conducting peak currents significantly more than the normal load current in the "run" condition.

In the "run" mode, the base reference voltage of current source 48 is provided at input 48a by sensor 50′ and its associated bridge amplifier means 155. In the illustrated example, thermistor 50′ is part of a bridge network (along with resistors 160a and 160b, 166a and 166b, 166′ and 158). If the load resistance temperature is at the desired temperature, amplifier first input 156a voltage $V_t$ is essentially equal to amplifier second input 156 voltage V1. Amplifier output 156c is at a desired level, and, by adjustment of variable resistance 168′, this determines the voltage below operating potential $V_a$ on the base electrode of fourth current source transistor 48′. The base electrode voltage in turn determines the current through emitter resistor R3 and therefore the source output current I4 added to the integration bus 32. At the desired resistance operating temperature, this current I4, added to the fixed current I1 from first current source 36, charges integration capacitance 30 at a linear rate, providing the integration voltage $V_I$ with the desired linear portion 205g, after the cessation of zero-crossing pulse 20′, in the interval from time $t_7$ to time $t_8$, during the source waveform half-cycle 200g. This results in linearly-increasing portion 205g crossing the reference voltage line 210 at time ($t_8$-$T_D$), at which time the first comparator output 26a changes state and clocks the logic 1 level at the data D input of gate flip-flop 24′ through means 22 and turns on power switching means 14 to enable the beginning of current pulse 215f. Pulse 215f ends with the next zero-crossing pulse 20′, at time $t_8$ at the end of the particular source waveform half-cycle. Thus, load current flows for the total time interval $T_D$, which is the time interval required to provide sufficient current for maintaining the load resistance at the desired temperature. The starting time, at forward edge 215f′ of the load current pulse, can be varied in either direction, as indicated by arrows A (FIG. 1d), responsive to load resistance temperature changes, to control the load currents and hence the load temperature, for any setting of load temperature-setting control 166′.

If the load temperature decreases, due to a temporarily increased load resistance, decreased line voltage or the like, the thermistor resistance increases and monitored voltage $V_t$ increases, resulting in a decrease in the voltage at fourth current source control input 48a. Responsive thereto, the base electrode of fourth source transistor 48' is lowered in voltage, and the voltage across resistance R3 is increased, increasing current I4. This increases the total current supplied to integrating capacitance 30, and increases the slope of the integrated voltage $V_I$ ramp portion, e.g. portion 205h (FIG. 1c), such that voltage $V_I$ reaches the reference voltage $V_R$ level 210 with a decreased delay after the associated zero crossing (e.g. the zero crossing at time $t_8$, for the associated source waveform half-cycle, e.g. 200h). The load current pulse 215g now commences at a time ($t_9 - T_D^+$) wherein the current pulse leading edge 215g' occurs sooner into the half-cycle than the leading edge 215f' of the current pulse 215f when the load is at the desired parameter level. The increased load current conduction time interval $T_D^+$ of pulse 215g increases the dissipated load power and, therefore, the load temperature. Additional current pulses of duration greater than the duration $T_D$, for the desired parameter level, will occur during additional source waveform half-cycles (not shown), with the pulse duration gradually decreasing as the load temperature increases, until the load temperature is raised to the desired level. At the desired level, the thermistor sensor 50' resistance is such that the bridge is balanced and the control voltage at fourth current source input 48a returns to the level at which the desired pulse width $T_D$ current pulses 215f are produced. It should be understood that the maximum duration of increased-current pulses 215g may be set by varying resistance 168', or that variable resistance 168' and its companion fixed resistances 168a and 168b may be replaced by a single fixed resistor, which will establish a fixed limit on the voltage to which the base electrode of fourth current source transistor 48' can be pulled, below operating potential $+V_a$, by the sensor amplifier output voltage. This will provide a maximum phase-forward limit for the conduction period T of pulses 215 and establish the maximum current rating for the devices 16 of power switching means 14 in the normal "run" mode.

It will be seen that in the opposite situation, wherein the temperature of resistive load 12 rises, the temperature-monitoring sensor thermistor 13' resistance decreases and causes a decrease in the value of voltage $V_t$ to provide an increase in the voltage at fourth current source control input 48a. Responsive thereto, the voltage at the base electrode of fourth current source transistor 48' rises, providing a decreased voltage across resistance 56 and decreasing the fourth current source output current I4. The total current provided to integration capacitor 30 decreases and the decreased slope of integrated voltage $V_I$ portion 205i is obtained. This results in an increased time, after the zero-crossing pulse (e.g. pulse 20' at time $t_9$) starting a particular source waveform half-cycle interval, e.g. the interval from time $t_9$ to time $t_{10}$ for waveform half-cycle 200i, so that the integrated voltage portion 205i does not reach the reference voltage line 210i until a later time than in the desired load resistance case. The first comparator positive-going transition, forming the gate flip-flop clock C input enabling edge, occurs at a later time, e.g. at time ($t_{10}-T_D^-$), in the half-cycle interval, enabling power switching means 14 later during that half-cycle and providing a load current $I_L$ conduction pulse 215h of somewhat decreased duration, e.g. duration $T_D^-$. Thus, the current pulse starts at leading edge 215h', which occurs later during the source waveform half-cycle then the leading edge 215f' responsive to the load operating at its desired parameter level. The decreased current-conduction interval $T_D^-$ reduces the load power dissipation and, therefore, the load temperature; additional cycles (not shown) with shortened current-conduction pulses 215h occur, with the width of the pulses gradually increasing, as the load temperature decreases, until the desired current-conduction pulse width $T_D$ is obtained when the load returns to the desired temperature level. In the foregoing manner, the monitored load parameter, e.g. load temperature, is controlled in the "run" mode.

As previously mentioned hereinabove, upon circuit turn-off and subsequent turn-on, or upon loss of source waveform zero-crossing synchronization lock, the LOCK output 20c of PLL means 20 is again at the logic 1 level, causing circuit 10 to reenter the "start" mode, once line waveform synchronization lock is reacquired, and causing the increasing-duration current pulses 215a–215e to occur before the "run" mode can be reestablished.

While my novel soft-starting phase-control circuit for low voltage load has been described with particular reference to a presently preferred embodiment thereof, many variations and modifications will now become apparent to those skilled in the art. It is my intent, therefore, to be limited only by the scope of the appending claims, and not by the particular details or instrumentalities described by way of explanation of a preferred embodiment herein.

What I claim is:

1. A circuit for phase-controlling both the starting and normal operating flows of current from an A.C. source to a load, comprising:

power switching means for selectively respectively enabling and disabling a connection of said source to said load, responsive to respective first and second states of a control signal;

means for generating at least one signal having a transition in a selected direction occurring substantially at each of a sequential plurality of zero crossings of the source signal waveform and for also providing a lock signal only if said at least one signal selected transition occurs essentially at each sequential one of said source signal waveform zero crossings;

means for generating a ramp signal commencing at a first magnitude responsive to the selected transition of each of said at least one signal and reaching a second magnitude, greater than said first magnitude, by the occurrence of the selected transition of the next successive one of said at least one signal;

means for providing said first control signal state responsive to the instantaneous magnitude of said ramp signal exceeding a predetermined magnitude and for thereafter providing said second control signal state responsive to the selected transition of the next successive one of said at least one signal;

first means, responsive to the presence of said lock signal, for controlling the slope of said ramp signal to increase the second magnitude thereof over a plurality of time intervals each between successive ones of the selected transition of said at least one pulse signal, from a magnitude less than said predetermined magnitude to a magnitude greater than said predetermined magnitude, to cause said power switching means to enable a starting load current flow increasing from a substantially zero initial magnitude toward a magnitude greater than the desired normal operating magnitude;

second means, monitoring a selected parameter of said load, for controlling the slope of said ramp signal to cause said second magnitude to vary responsive to the sensed load parameter; and switching means for enabling said first means to control said ramp signal slope until said sensed load parameter approaches a preselected value thereof and for then switching control of said ramp signal slope to said second means for controlling the duration of current flow during each source waveform cycle thereafter to cause said load current flow to maintain substantially the said preselected value of said sensed load parameter.

2. The circuit of claim 1, wherein said ramp signal generating means comprises: an integrating element across which said ramp signal is formed by integration of the sum of all source signals presented thereto; first signal source means for providing a first source signal to said integration element; and means for resetting the magnitude of the signal across said integrating element to said first magnitude responsive to each selected transition.

3. The circuit of claim 2, wherein said ramp signal generating means resets the ramp signal magnitude to a substantially-constant first magnitude at said occurrence of said selected transition; and said first source provides a substantially-constant magnitude signal.

4. The circuit of claim 2, wherein said first source signal is of a magnitude insufficient to increase the ramp signal second magnitude to exceed said predetermined magnitude prior to the resetting of said integrating element signal.

5. The circuit of claim 4, wherein said integrating element is an integration capacitance.

6. The circuit of claim 5, wherein said first signal source is a substantially-constant current source.

7. The circuit of claim 2, wherein said resetting means comprises a switching device having an input and a controlled-conduction circuit coupled across said integrating element and controlled to a conductive condition responsive to each occurrence of said at least one signal selected transition at said input.

8. The circuit of claim 2, wherein said control signal state providing means comprises: means for providing a first condition if the integrated signal is less than said predetermined magnitude and for providing a second condition if said integrated signal is greater than said predetermined magnitude; and means for generating the control signal respective connection-enabling first state and connection-disabling second state responsive respectively to said first and second conditions.

9. The circuit of claim 8, wherein said condition providing means comprises: means for generating a reference signal of said predetermined magnitude; and means for comparing the reference signal magnitude to the instantaneous magnitude of said ramp signal for providing said first and second conditions respectively responsive to said ramp signal magnitude being less than or greater than said reference signal magnitude.

10. The circuit of claim 9, wherein the control signal controlling means includes means for controlling at least one of the turn-on and turn-off characteractics of said power switching means.

11. The circuit of claim 2, wherein said first means comprises: means responsive to at least said lock signal for providing, only if said lock signal is present, a second source signal of substantially monotonically-increasing magnitude to said integrating element over said plurality of time intervals.

12. The circuit of claim 11, further comprising means for disconnecting said second source signal from said integrating element responsive to said switching means switching control of said ramp signal slope to said second means.

13. The circuit of claim 12, wherein said integrating element is an integration capacitance; and said second signal providing means is a means for providing a variable current of magnitude increasing over said plurality of time intervals.

14. The circuit of claim 13, wherein said variable current source means comprises: a voltage-controlled current source having a control input and an output at which a controlled second current appears responsive to the magnitude of the voltage at said input; and means for providing to said control input a voltage having a magnitude sufficient to provide a substantially zero magnitude current from said second current source at least prior to the occurrence of said lock signal and for thereafter changing the control input voltage in a direction to substantially monotonically increase the controlled-source output second current to said integrating element.

15. The circuit of claim 14, wherein said control input voltage-providing means comprises: a timing network having a plurality of elements establishing the current source control input voltage responsive to a flow of a third current through said network; means for providing a substantially-constant third current flow through said network only after said lock signal is provided; and means cooperating with said network for assuring that said current source control input voltage is of a magnitude preventing a flow of said second current prior to enablement of said third current source by said lock signal.

16. The circuit of claim 11, wherein said first means is set to control the magnitude of the starting load current to never exceed a predetermined maximum magnitude.

17. The circuit of claim 2, wherein said second means comprises: means for providing a fourth current of variable magnitude responsive to at least the magnitude of the sensed load parameter; and means for respectively disabling and enabling said fourth current from being introduced into said integrating means responsive to said first means being respectively enabled and disabled, after the occurrence of said lock signal.

18. The circuit of claim 17, wherein said fourth current source is a voltage-controlled current source having a control input and an output at which said fourth current is provided with a magnitude responsive to the voltage at said control input; and further including: sensor means for monitoring the magnitude of said selected load parameter to provide a sensor output signal; and means for converting said sensor output signal to a voltage signal at said fourth current source control input.

19. The circuit of claim 18, wherein said load is a resistive load and said sensed load parameter is the temperature of said load.

20. The circuit of claim 19, wherein said sensor comprises: sensing means adjacent to said load for providing a sensor resistance of magnitude varying responsive to said load resistance temperature; and said converting means comprises bridge amplifier means for converting the sensor resistance magnitude to the magnitude of the voltage at said fourth current source means control input.

21. The circuit of claim 20, wherein said bridge amplifier means includes means for adjusting said fourth current source input voltage to a predetermined nominal value responsive to the actual sensor resistance at a predetermined temperature.

22. The circuit of claim 17, further comprising means for setting the maximum instantaneous magnitude of said fourth current to establish a maximum normal load current magnitude.

23. The circuit of claim 17, wherein said first means comprises: means responsive to at least said lock signal for providing, only if said lock signal is present, a second source signal if substantially monotonically-increasing magnitude over said plurality of time intervals to said integrating element.

24. The circuit of claim 23, wherein said switching means comprises: first means for generating a first signal responsive to the magnitude of said second source current; means for generating a second signal responsive to the sensed load parameter; means comparing said first and second generated signals for providing respective first and second conditions responsive to said first generated signal being respectively greater than and less than said sensed-load-parameter second generated signal; and means responsive to said comparing means respective first and second conditions for respectively enabling and disabling said first means and respectively disabling and enabling said second means to control said ramp signal slope.

25. The circuit of claim 24, wherein said first signal generating means comprises: means for providing a voltage responsive substantially only to the varying magnitude of said second current; said second signal generating means comprises means for generating a voltage responsive substantially only to the varying magnitude of said fourth current responsive to said sensed load parameter; and said comparing means comprises a voltage comparator having first and second inputs each coupled to receive an associated one of said first and second generated voltages and an output providing a signal having said first and second conditions dependent upon the relative magnitude of the voltages connected to the comparator inputs.

26. The circuit of claim 25, wherein said control means comprises a flip-flop logic element controlled by at least said comparator output signal.

27. The circuit of claim 1, wherein said at least one signal and lock signal generating means comprises: means for detecting zero crossings of said source signal waveform to provide selected-direction transitions of one of said at least one signal; and phase-locked loop (PLL) means receiving said zero-crossing detecting means output signal transitions for generating at a PLL means output one of said at least one signal having transitions in said desired direction and for also generating said lock signal when said PLL means output signal transitions occur essentially at each sequential one of said source signal waveform zero crossings.

28. The circuit of claim 1, wherein said power switching means includes at least one insulated gate transistor.

* * * * *